(12) United States Patent
Murakami et al.

(10) Patent No.: US 8,232,691 B2
(45) Date of Patent: Jul. 31, 2012

(54) STATOR

(75) Inventors: Satoshi Murakami, Hazu (JP); Koji Kato, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 367 days.

(21) Appl. No.: 12/656,780

(22) Filed: Feb. 16, 2010

(65) Prior Publication Data

US 2010/0244594 A1    Sep. 30, 2010

(30) Foreign Application Priority Data

Mar. 26, 2009   (JP) .................. 2009-076871

(51) Int. Cl.
*H02K 9/20* (2006.01)
(52) U.S. Cl. ............ 310/54; 30/58; 30/59; 30/89; 30/91
(58) Field of Classification Search .............. 310/52–59, 310/89, 91
See application file for complete search history.

(56) References Cited

U.S. PATENT DOCUMENTS

| | | | | |
|---|---|---|---|---|
| 5,019,737 A | * | 5/1991 | Bruno | 310/89 |
| 5,982,071 A | * | 11/1999 | Ehrick | 310/216.056 |
| 6,169,344 B1 | * | 1/2001 | Tsuruhara | 310/58 |
| 7,576,458 B2 | * | 8/2009 | Wehner et al. | 310/54 |
| 7,663,272 B2 | * | 2/2010 | Oyoung et al. | 310/54 |
| 7,675,209 B2 | * | 3/2010 | Masoudipour et al. | 310/89 |
| 2005/0285456 A1 | * | 12/2005 | Amagi et al. | 310/43 |

FOREIGN PATENT DOCUMENTS

| | | |
|---|---|---|
| JP | A-9-51656 | 2/1997 |
| JP | A-2001-112210 | 4/2001 |
| JP | A-2003-324901 | 11/2003 |
| JP | A-2005-229671 | 8/2005 |
| JP | A-2005-229672 | 8/2005 |
| JP | A-2006-311750 | 11/2006 |
| JP | A-2008-178243 | 7/2008 |

OTHER PUBLICATIONS

International Search Report mailed May 11, 2010 in International Application No. PCT/JP2010/051598 (with translation).

* cited by examiner

*Primary Examiner* — Tran Nguyen
(74) *Attorney, Agent, or Firm* — Oliff & Berridge, PLC

(57) ABSTRACT

A stator includes a substantially cylindrical stator core, which has a fixing ridge provided with a fastening portion for fixing, and which is positioned so that an axial center of the stator extends substantially horizontally; and sealing members, which are respectively attached to both axial ends of the stator core so as to be positioned on a side of the uppermost part of the main body outer peripheral surface with respect to the target ridge, and which respectively form sealing walls that have a height equal to or higher than a horizontal plane extending in the uppermost part of the ridge outer peripheral surface, wherein a recess surrounded by the ridge outer peripheral surface, the main body outer peripheral surface, and the sealing walls serves as a refrigerant reservoir recess for storing a refrigerant.

25 Claims, 3 Drawing Sheets

STATOR

INCORPORATION BY REFERENCE

The disclosure of Japanese Patent Application No. 2009-076871 filed on Mar. 26, 2009 including the specification, drawings and abstract is incorporated herein by reference in its entirety.

BACKGROUND

The present invention relates to stators, which include a substantially cylindrical stator core having fixing ridges, each provided with a fastening portion for fixing, and which are positioned so that the axial center thereof extends substantially horizontally.

Japanese Patent Application Publication No. 2008-178243, for example, discloses the following structure of a rotating electrical machine, as a technique relating to rotating electrical machines that include a stator serving as an armature formed by winding a coil around a substantially cylindrical stator core, and a rotor serving as a field magnet rotatably supported radially inside the stator. That is, in this rotating electrical machine, a refrigerant flow passage, through which a refrigerant for cooling the stator passes, is provided above the stator. A discharge hole capable of discharging the refrigerant is formed in the refrigerant flow passage, and the refrigerant is supplied to the upper surface of the stator core via the discharge hole. The refrigerant supplied to the upper surface of the stator core flows downward along the outer peripheral surface of the stator core according to gravity, and the stator core is cooled by heat exchange, which occurs between the refrigerant and the stator core until the refrigerant drops from the stator core.

SUMMARY

However, in the structure described in Japanese Patent Application Publication No. 2008-178243, a path through which the refrigerant supplied to the upper surface of the stator core flows until it drops from the stator core is not controlled at all. Thus, the refrigerant supplied to the upper surface of the stator core flows mainly at a specific axial position corresponding to the discharge hole formed in the refrigerant flow passage. Thus, the temperature of the stator core may become non-uniform in the axial direction.

Moreover, the stator core may include fastening portions for fixing the stator core to a case accommodating the stator core. In this case, it is desirable to provide these fastening portions for fixing in such a form that can reduce the influence on a magnetic circuit formed by the stator, and typically, such fastening portions for fixing are often provided in fixing ridges, which are formed so as to protrude radially outward from the outer peripheral surface of the stator core along the entire axial length of the stator core. In the case where the stator core has such fixing ridges in the structure described in Japanese Patent Application Publication No. 2008-178243, the fixing ridges can hinder the flow of the refrigerant flowing downward along the outer peripheral surface of the stator core, depending on the positions of the fixing ridges, whereby the refrigerant may not be appropriately supplied to the region lower than the fixing ridges. That is, in the structure described in Japanese Patent Application Publication No. 2008-178243, the temperature of the stator core can become non-uniform in the circumferential direction as well.

The present invention was developed in view of the above problems, and it is an object of the present invention to provide a stator, which includes a substantially cylindrical stator core having fixing ridges, each provided with a fastening portion for fixing, which is positioned so that its axial center extends substantially horizontally, and which is capable of reducing the possibility that the temperature of the stator core becomes non-uniform in axial and circumferential directions In order to achieve the above object, a stator according to a first aspect of the present invention includes: a substantially cylindrical stator core, which has a fixing ridge provided with a fastening portion for fixing, and which is positioned so that an axial center of the stator extends substantially horizontally. A characteristic structure of this stator is that: the fixing ridge is formed at a circumferential location of a cylindrical main body portion of the stator core, and protrudes radially outward from a main body outer peripheral surface, which is an outer peripheral surface of the main body portion, along an entire axial length of the main body portion; the fixing ridge which satisfies the following conditions is a target ridge: an uppermost part of a ridge outer peripheral surface, which is an outer peripheral surface of the fixing ridge, is located at the same height as, or lower than a horizontal plane extending in an uppermost part of the main body outer peripheral surface, and the uppermost part of the ridge outer peripheral surface does not correspond to a boundary with the main body outer peripheral surface; the stator further includes sealing members, which are respectively attached to both axial ends of the stator core so as to be positioned on a side of the uppermost part of the main body outer peripheral surface with respect to the target ridge, and which respectively form sealing walls that have a height equal to or higher than a horizontal plane extending in the uppermost part of the ridge outer peripheral surface; and a recess surrounded by the ridge outer peripheral surface, the main body outer peripheral surface, and the sealing walls serves as a refrigerant reservoir recess for storing a refrigerant.

With the above characteristic structure, the fixing ridge, which can hinder the flow of the refrigerant flowing downward along the outer peripheral surface of the stator core, can be the target ridge, and the refrigerant reservoir recess for storing the refrigerant can be formed by effectively using the ridge outer peripheral surface, which is the outer peripheral surface of the target ridge. Since the refrigerant reservoir recess is typically formed substantially uniformly in the axial direction, the refrigerant, which has overflowed the refrigerant reservoir recess beyond the uppermost part of the ridge outer peripheral surface, flows downward axially uniformly along the outer peripheral surface of the stator core. Thus, the refrigerant can be supplied axially uniformly to the outer peripheral surface of the stator core by merely supplying the refrigerant to any position in the refrigerant reservoir recess. Moreover, since the refrigerant, which has overflowed the refrigerant reservoir recess beyond the uppermost part of the ridge outer peripheral surface, is supplied to the outer peripheral surface of the stator core located lower than the target ridge, the refrigerant can be supplied to the outer peripheral surface of the stator core extensively in the circumferential direction. Thus, the possibility that the temperature of the stator core becomes non-uniform in the axial and circumferential directions can be reduced by a simple structure implemented by respectively attaching the sealing members to both axial ends of the stator core.

It is preferable that the stator core be fixed so that the uppermost part of the ridge outer peripheral surface is located at the same height as the horizontal plane extending in the uppermost part of the main body outer peripheral surface.

With this structure, the refrigerant stored in the refrigerant reservoir recess can be supplied not only to the outer peripheral surface of the stator core located lower than the target ridge, but also to the outer peripheral surface of the stator core located on the side opposite to the target ridge in the circumferential direction with respect to the uppermost part of the main body outer peripheral surface. Thus, the refrigerant can be supplied to both sides of the uppermost part of the main body outer peripheral surface in the circumferential direction by merely supplying the refrigerant to the refrigerant reservoir recess.

It is preferable that the sealing members be attached so that respective wall surfaces of the sealing walls contact axial end faces of the stator core, respectively.

With this structure, both axial wall surfaces of the refrigerant reservoir recess can be formed by the sealing walls by merely attaching the sealing members, and the refrigerant can be stored in the refrigerant reservoir recess. Thus, the possibility that the temperature of the stator core becomes non-uniform in the axial and circumferential directions can be more reliably reduced.

It is preferable that the stator further include cover members that respectively cover coil end portions of a coil wound around the stator core, which respectively protrude from the axial end faces of the stator core, and each of the cover members include an inner communication port that allows a accommodating chamber accommodating a corresponding one of the coil end portions therein, and the refrigerant reservoir recess to communicate with each other.

With this structure, the refrigerant stored in the refrigerant reservoir recess can be supplied not only to the outer peripheral surface of the stator core, but also to the coil end portions. Thus, both the stator core and the coil end portions can be cooled by merely supplying the refrigerant to the refrigerant reservoir recess. In this case, since the coil end portions are respectively accommodated in the respective accommodating chambers of the cover members, the supplied refrigerant can be easily supplied to the entire coil end portions. Moreover, the amount of refrigerant to be supplied to the accommodating chambers respectively accommodating the coil end portions therein can be adjusted by adjusting the size of the opening of the inner communication ports. That is, the amount of refrigerant to be used to cool the stator core and the amount of refrigerant to be used to cool the coil end portions can be controlled by a simple structure.

It is preferable that each of the cover members include a bath-shaped portion having a refrigerant inlet, where the refrigerant inlet is open upward and communicates with the refrigerant reservoir recess, and the inner communication port be provided in a bottom of the bath-shaped portion.

With this structure, the refrigerant supplied from the refrigerant reservoir recess can be supplied to the accommodating chambers respectively accommodating the coil end portions therein, after being temporarily stored in the bath-shaped portions. Thus, the coil end portions can be cooled appropriately.

It is preferable that each of the cover members be formed integrally with a corresponding one of the sealing members, and be attachable to the fastening portion provided in the target ridge, and the sealing members and the cover members be fixed, together with the stator core, to a case by using the fastening portions.

With the above structure, since each cover member is formed integrally with a corresponding sealing member, an increase in the number of parts can be suppressed. The manufacturing process can be simplified when each cover member is formed integrally with a corresponding sealing member as a cast part such as a resin. Moreover, since both the sealing members and the cover members are fixed together with the stator core to the case, the assembly operation can be simplified.

It is preferable that the case include a seat that contacts one axial end of the target ridge in a state where the stator core is fixed, and the sealing member located on one axial side be formed by the seat.

With this structure, the sealing member located on one axial side can be formed in the case by effectively using the existing structure. This can suppress an increase in the number of parts, and can also simplify the assembly operation.

It is preferable that a recess groove, which is recessed downward with respect to the uppermost part of the ridge outer peripheral surface, be formed at one or more axial positions of the target ridge.

With the above structure, the refrigerant, which overflows the refrigerant reservoir recess, can be actively guided to the recess groove. Thus, the axial distribution of the amount of refrigerant, which flows along the outer peripheral surface of the stator core located lower than the target ridge, can be appropriately controlled by appropriately determining the formation position of the recess groove.

It is preferable that the stator further include a refrigerant flow passage through which the refrigerant flows, and the refrigerant flow passage have a discharge hole for discharging the refrigerant, where the discharge hole is provided at least above the refrigerant reservoir recess.

With this structure, the refrigerant can be reliably supplied to the refrigerant reservoir recess by a simple structure.

DETAILED DESCRIPTION OF EMBODIMENTS

Figure 1:
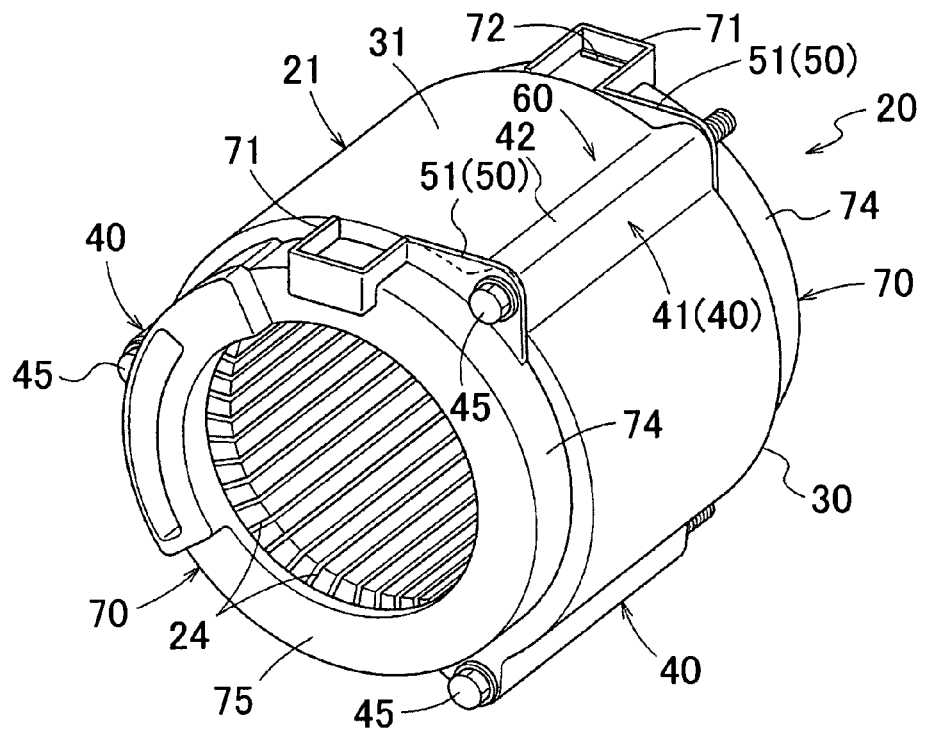
FIG. 1 is a perspective view of a stator according to an embodiment of the present invention.

An embodiment of a stator according to the present invention will be described with reference to the accompanying drawings. The present embodiment is described with respect to an example in which the present invention is applied to a stator for inner rotor-type rotating electrical machines. A stator 20 of the present embodiment is characterized in that a fixing ridge 40 that satisfies certain conditions is selected as a target ridge 41, and a refrigerant reservoir recess 60 for storing a refrigerant is formed by using the target ridge 41. Providing the refrigerant reservoir recess 60 reduces the possibility that the temperature of a stator core 21 becomes non-uniform in axial and circumferential directions. The structure of the stator 20 according to the present embodiment will be described in detail below with reference to FIGS. 1 through 3. Note that, in the following description, the axial direction, the circumferential direction, and the radial direction are defined based on the central axis of the stator 20 unless otherwise specified. Moreover, "upper" indicates an upward vertical direction, and "lower" indicates a downward vertical direction.

1. Structure of Stator

Figure 2:
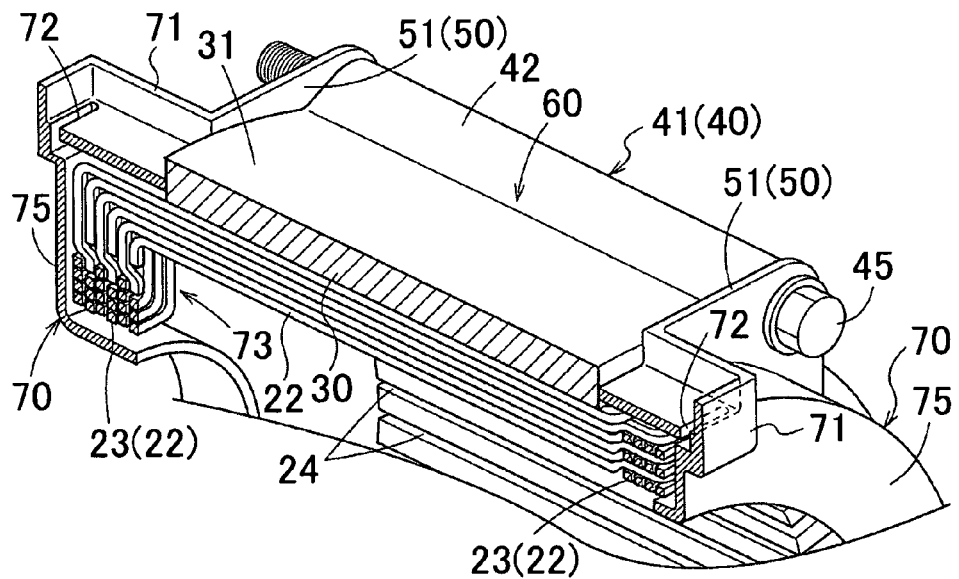
FIG. 2 is an axial cross-sectional perspective view of the stator according to the embodiment of the present invention.

As shown in FIGS. 1 and 2, the stator 20 mainly includes the stator core 21, and cover members 70 that are respectively attached to both axial ends of the stator core 21. A coil 22 is wound around the stator core 21, and a magnetic field can be generated by applying a current to the coil 22. Note that the coil 22 is not shown in FIG. 1, and only a part of the coil 22 that is wound around the stator core 21 is shown in FIG. 2. Although not shown in the figure, a rotor as a field magnet having a permanent magnet or an electromagnet is disposed radially inside the stator core 21 so as to be rotatable relative to the stator core 21. That is, the stator 20 of the present embodiment is a stator for inner rotor type, revolving-field type rotating electrical machines. The "rotating electrical machine" is herein used as a concept including a motor (an electric motor), a generator (an electric generator), and a motor-generator that functions either as the motor or the generator as required.

As shown in FIG. 1, the stator core 21 has a substantially cylindrical shape, and is disposed so that its axial center extends substantially horizontally. The stator core 21 includes a cylindrical main body portion 30, and fixing ridges 40 each provided with a fastening portion for fixing. Note that, in the present embodiment, the stator core 21 is fixed to a case (not shown). The outer peripheral surface of the main body portion 30 of the stator core 21 is herein referred to as a main body outer peripheral surface 31, and the outer peripheral surface of each fixing ridge 40 is referred to as a ridge outer peripheral surface 42. The fixing ridges 40 are respectively formed in regions in the circumferential direction of the main body portion 30 of the stator core 21, and protrude radially outward from the main body outer peripheral surface 31 along the entire axial length of the main body portion 30. In the present embodiment, three fixing ridges 40 are substantially equally distributed along the circumferential direction. An insertion hole 43 (see FIG. 3) for inserting a fastening bolt 45 therethrough is provided as a fastening portion for fixing in each fixing ridge 40. Thus, the stator core 21 is fixedly fastened to the case by the fastening bolts 45. In the present embodiment, the insertion holes 43 correspond to the fastening portions in the present invention. Note that the fastening portions in the present invention are not limited to the insertion holes 43.

A plurality of slots 24, which extend in the axial direction of the stator core 21, are provided in the inner peripheral surface of the stator core 21 at predetermined intervals along the circumferential direction. Each slot 24 has the same cross sectional shape, has a predetermined width and a predetermined depth, and is open to the inner peripheral surface side. The coil 22 is wound in each slot 24, whereby coil end portions 23, which respectively protrude from axial end faces of the stator core 21, are formed as shown in FIG. 2. A plurality of linear conductors of the coil 22 are inserted in each slot 24. In this example, six linear conductors are inserted in each slot 24.

The stator core 21 is a laminated structure of a plurality of annular disc-shaped electromagnetic steel plates. Although detailed description is omitted, protruding portions are respectively formed on the outer diameter side of each electromagnetic steel plate at positions that substantially equally divide the outer periphery of the electromagnetic steel plate into three parts. The protruding portions are formed so as to protrude radially outward, and each protruding portion has a hole having the same diameter as that of the insertion holes 43. In the state where the electromagnetic steel plates are laminated together, the respective protruding portions of the electromagnetic steel plates overlap each other in the laminating direction (the same direction as the axial direction), thereby forming the three fixing ridges 40, each having the insertion hole 43 therein. That is, in the present embodiment, the fixing ridges 40 are formed integrally with the main body portion 30 of the stator core 21. Note that the stator core 21 is not limited to a laminated structure of a plurality of electromagnetic steel plates. For example, it is also preferable that the stator core 21 be formed mainly by a green compact formed by compression molding magnetic powder which is powder of a magnetic material. The fixing ridges 40 may be formed as separate members from the main body portion 30 of the stator core 21.

The cover members 70 are members that respectively cover the coil end portions 23 of the coil 22, which respectively protrude from the axial end faces of the stator core 21. As shown in FIGS. 1 and 2, each cover member 70 includes a sealing wall 51, a bath-shaped portion 71, a peripheral wall 74, and an end wall 75. Note that each of the respective sealing walls 51 of the cover members 70 is formed by a sealing member 50, and in this example, each sealing member 50 is formed integrally with a corresponding one of the cover members 70 as a part of the cover member 70. In other words, the cover members 70 are respectively formed integrally with the sealing members 50. Attachment holes for inserting the fastening bolts 45 therethrough, respectively, are formed in each sealing wall 51. By using the attachment holes, the cover members 70 are fixed, together with the stator core 21, to the case (not shown) by the fastening bolts 45. Thus, in the present embodiment, the cover members 70 are structured so as to be attachable to the insertion holes 43 as fastening portions respectively provided in the fixing ridges 40 (the target ridge 41), and the sealing members 50 and the cover members 70 are fixed, together with the stator core 21, to the case by using the insertion holes 43. As shown in FIG. 2, each coil end portion 23 is accommodated in an accommodating chamber 73, which is a space defined by the inner surface of a corresponding one of the cover members 70. Note that the cover members 70 are made of an insulating material such as a resin. Note that the sealing members 50 and the cover members 70 may be fixed to the case separately from the stator core 21.

The sealing members 50 are attached to the target ridge 41, which is selected from the fixing ridges 40 as a fixing ridge that satisfies the predetermined conditions. The predetermined conditions are the conditions that "the uppermost part of the ridge outer peripheral surface 42 is located at the same height as, or lower than a horizontal plane extending in the uppermost part of the main body outer peripheral surface 31, and the uppermost part of the ridge outer peripheral surface 42 does not correspond to the boundary with the main body outer peripheral surface 31." Based on such conditions, the fixing ridge 40, which forms a recess between the fixing ridge 40 itself and the main body outer peripheral surface 31, can be appropriately selected as the target ridge 41, and the refrigerant reservoir recess 60 can be formed by using the target ridge 41, as described below. That is, the sealing members 50, which are respectively formed integrally with the cover members 70, are respectively attached to both axial ends of the stator core 21 so as to be positioned on the side of the uppermost part of the main body outer peripheral surface 31 with respect to the target ridge 41. In the present embodiment, the cover members 70, each integrally having the sealing member 50, are attached so that the respective wall surfaces of the sealing walls 51 contact the axial end faces of the stator core 21, respectively. The sealing walls 51 are formed so as to have a height that is equal to or higher than the horizontal plane extending in the uppermost part of the ridge outer peripheral surface 42. Note that, in this example, the sealing walls 51 have such a height that the respective upper ends of the sealing walls 51 are positioned higher than the horizontal plane extending in the uppermost part of the ridge outer peripheral surface 42. As shown in FIG. 1, the refrigerant reservoir recess 60 for storing a refrigerant is formed by a recess, which is surrounded by the ridge outer peripheral surface 42 of the target ridge 41, the main body outer peripheral surface 31 located on the side of the uppermost part of the main body outer peripheral surface 31 with respect to the target ridge 41, and the sealing walls 51 respectively formed by the sealing members 50. A cooling mechanism of the stator 20 using this refrigerant reservoir recess 60 will be described later.

Figure 3:
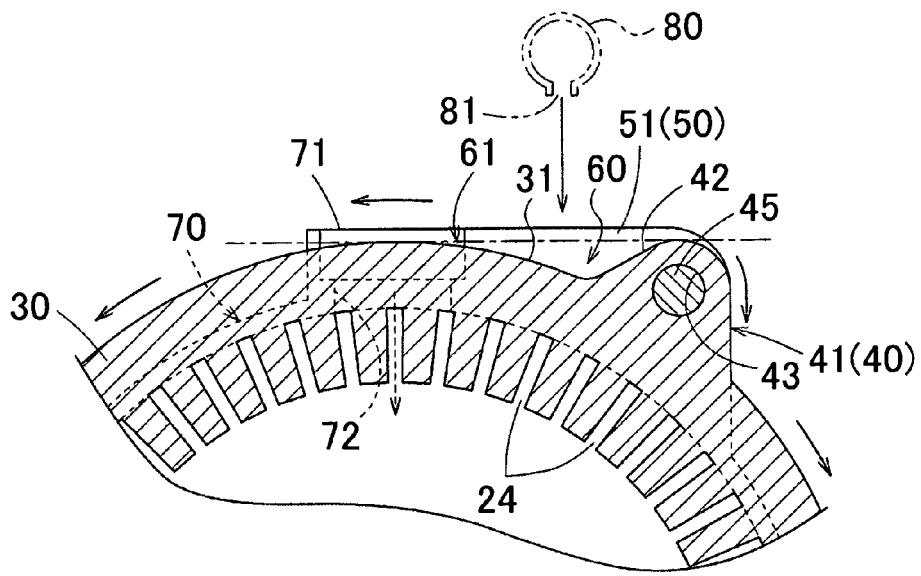
FIG. 3 is a radial cross sectional view of the stator according to the embodiment of the present invention.

If there are a plurality of fixing ridges 40 that satisfy the above predetermined conditions, it is preferable that at least a fixing ridge 40 that is located at the uppermost position be used as the target ridge 41. In this case, all the fixing ridges 40 that satisfy the predetermined conditions may be used as the target ridges 41, and the sealing members 50 may be attached to all the target ridges 41. In the present embodiment, of the fixing ridges 40 that satisfy the above predetermined conditions, only one fixing ridge 40 that is located at the uppermost position may be used as the target ridge 41, or a predetermined number of fixing ridges 40 from the uppermost position may be selected as the target ridges 41. In the present invention, only one fixing ridge 40 satisfies the above predetermined conditions, and the sealing members 50 are attached to this fixing ridge 40 (the target ridge 41). In the present embodiment, as shown in FIG. 3, the stator core 21 is fixed to the case (not shown) so that the uppermost part of the ridge outer peripheral surface 42 of the target ridge portion 41 is positioned at the same height as the horizontal plane extending in the uppermost part of the main body outer peripheral surface 31.

Note that, as described above, the stator core 21 includes the cylindrical main body portion 30, and the fixing ridges 40, and has a substantially cylindrical overall shape. As shown in FIGS. 1 and 2, the fixing ridges 40 are formed substantially uniformly in the axial direction. Thus, in the present embodiment, the "boundary with the main body outer peripheral surface 31" in the above predetermined conditions is defined as follows. That is, the intersection between a circular arc formed by the main body outer peripheral surface 31 of the main body portion 30, and a line segment formed by the ridge outer peripheral surface 42 of the fixing ridge 40 is defined as the boundary of the ridge outer peripheral surface 42 with the main body outer peripheral surface 31.

Each bath-shaped portion 71 has a refrigerant inlet 61 (see FIG. 3), which is open upward and communicates with the refrigerant reservoir recess 60. In the present embodiment, each bath-shaped portion 71 is formed so as to extend across the uppermost part of the peripheral wall 74 of a corresponding cover member 70. An inner communication port 72 is provided in the bottom of each bath-shaped portion 71. Each inner communication port 72 allows the accommodating chamber 73 formed inside a corresponding cover member 70, and a corresponding bath-shaped portion 71 to communicate with each other. As described above, the bath-shaped portions 71 and the refrigerant reservoir recess 60 communicate with each other via the respective refrigerant inlets 61. Thus, in the present embodiment, each inner communication port 72 allows the refrigerant reservoir recess 60, and a corresponding accommodating chamber 73, which accommodates a corresponding coil end portion 23 therein, to communicate with each other via a corresponding refrigerant inlet 61 and a corresponding bath-shaped portion 71. Note that it is also preferable that each bath-shaped portion 71 be formed at a position other than the uppermost part of the peripheral wall 74 of a corresponding cover member 70, and that the bath-shaped portions 71 be structured not to be open upward. Each inner communication port 72 may be formed in a portion other than the bottom of a corresponding bath-shaped portion 71.

As shown in FIG. 1, the peripheral wall 74 of each cover member 70 has a cylindrical shape that covers the outer peripheral surface of a corresponding coil end portion 23 along the entire circumference. In this example, the "outer peripheral surface of the coil end portion 23" is a surface that extends along the radially outermost periphery of a plurality of linear conductors of the coil end portion 23. The peripheral wall 74 of each cover member 70 is formed so as to have an axial height higher than that of the coil end portions 23, and so as to cover the entire axial length of the outer peripheral surface of a corresponding coil end portion 23.

The end wall 75 of each cover member 70 extends radially inward from an end of the peripheral wall 74, which is located on the side opposite to the stator core 21 in the axial direction, so as to cover an axial end of a corresponding coil end portion 23. The "axial end of the coil end portion 23" is an end of the coil end portion 23, which is located on the side opposite to the stator core 21 in the axial direction. As shown in FIG. 2, in the present embodiment, the end wall 75 of each cover member 70 covers the entire radial length of the axial end of a corresponding coil end portion 23. Moreover, the end wall 75 of each cover member 70 extends from its radially inner end face toward the stator core 21 in the axial direction so as to cover at least a part of the inner peripheral surface of a corresponding coil end portion 23. In the example of FIG. 2, the end wall portion 75 of the cover member 70 located on one axial side (on the upper left side in FIG. 2) is formed so as to cover the substantially entire axial length of the inner peripheral surface of a corresponding coil end portion 23. On the other hand, the end wall portion 75 of the cover member 70 located on the other axial side (the lower right side in FIG. 2) is formed so as to cover a part of the inner peripheral surface of the coil end portion 23, which is located on the side opposite to the stator core 21 in the axial direction. In this example, the "inner peripheral surface of the coil end portion 23" is a surface that extends along the radially innermost periphery of the plurality of linear conductors of the coil end portion 23.

As shown in FIG. 2, the coil end portions 23 at both axial ends have different shapes from each other. Regarding the cover members 70, the axial length of the peripheral wall 74, the radial length of the end wall 75, and the like are determined according to the shape of a corresponding coil end portion 23. Note that the structure of the cover members 70 is not limited to the above structure. Thus, it is also preferable that the end wall 75 do not have any part extending from its radially inner end toward the stator core 21 in the axial direction. It is also preferable that the end wall 75 cover only an outer part of the radial length of the axial end of a corresponding coil end portion 23. The cover members 70 may be structured to have no end wall 75. In this case, it is also preferable that the peripheral wall 74 cover only a part of the axial length of the outer peripheral surface of a corresponding coil end portion 23.

Although not shown in the figure, a radial wall is formed on the inner surface of the cover member 70 attached to one axial side (the upper left side in FIG. 2), so as to protrude radially inward from the peripheral wall 74. More specifically, the radial wall is disposed in a radial pattern along the radial direction, and is shaped so that the radial wall can be inserted from radially outside into a space formed by the linear conductors of the coil end portion 23. Thus, the gap between the linear conductors of the coil end portion 23 is reduced at the insertion positions of the radial wall.

2. Cooling Mechanism of Stator

As described above, the stator 20 of the present embodiment has the cover members 70 formed integrally with the sealing members 50, respectively, and the refrigerant reservoir recess 60 for storing the refrigerant is formed by the recess, which is surrounded by the ridge outer peripheral surface 42 of the target ridge 41, the main body outer peripheral surface 31 located on the side of the uppermost part of the main body outer peripheral surface 31 with respect to the target ridge 41, and the sealing walls 51 respectively formed by the sealing members 50. The cooling mechanism of the stator 20 using the refrigerant reservoir recess 60 will be described in detail below. Note that, in the following description, the ridge outer peripheral surface 42 refers to the ridge outer peripheral surface 42 of the target ridge 41 unless otherwise specified.

As shown in FIG. 3, the stator 20 of the present embodiment has a refrigerant flow passage 80 through which the refrigerant flows. For example, the refrigerant flow passage 80 can be formed in the case (not shown) to which the stator core 21 is attached, or can be formed as a separate member from the case. The refrigerant is supplied to the refrigerant flow passage 80 by operating a pump (not shown). Various known coolants can be used as the refrigerant. For example, oil can be used as the refrigerant. The refrigerant flow passage 80 has a discharge hole 81 for discharging the refrigerant, and the discharge hole 81 is positioned above the refrigerant reservoir recess 60. This enables the refrigerant to be supplied to the refrigerant reservoir recess 60 by merely dropping the refrigerant from the discharge hole 81 by using gravity. The flow of the refrigerant discharged from the discharge hole 81 is shown by solid and broken arrows in FIG. 3.

As shown in FIG. 2, since the refrigerant reservoir recess 60 is surrounded on four sides, the refrigerant supplied to the refrigerant reservoir recess 60 is stored in the refrigerant reservoir recess 60. After the liquid level of the refrigerant stored in the refrigerant reservoir recess 60 becomes substantially the same as the height of the uppermost part of the ridge outer peripheral surface 42, an amount of refrigerant, which corresponds to that of refrigerant that is additionally supplied to the refrigerant reservoir recess 60, flows over the uppermost part of the ridge outer peripheral surface 42, and is supplied to the main body outer peripheral surface 31 located lower than the target ridge 41 along the circumferential direction. Thus, the refrigerant can be appropriately supplied even to the outer peripheral surface of the stator core 21, to which the refrigerant normally may not be appropriately supplied due to the hindrance of the flow of the refrigerant by the target ridge 41. Thus, the refrigerant can be supplied to the outer peripheral surface of the stator core 21 extensively in the circumferential direction.

As shown in FIGS. 1 and 2, the target ridge 41 is formed uniformly in the axial direction. Thus, the flow distribution of the refrigerant that overflows the refrigerant reservoir recess 60 does not greatly depend on the position of the discharge hole 81 of the refrigerant flow passage 80 with respect to the refrigerant reservoir recess 60, but the refrigerant supplied from the refrigerant flow passage 80 is supplied substantially uniformly in the axial direction to the main body outer peripheral surface 31 located lower than the target ridge 41 along the circumferential direction. That is, by merely supplying the refrigerant to any position in the refrigerant reservoir recess 60, the refrigerant can be supplied substantially uniformly in the axial direction to the main body outer peripheral surface 31 located lower than the target ridge 41 along the circumferential direction.

Moreover, in the present embodiment, the uppermost part of the ridge outer peripheral surface 42 is located at the same height as the horizontal plane extending in the uppermost part of the main body outer peripheral surface 31, as described above. Thus, as shown in FIG. 3, the refrigerant supplied to the refrigerant reservoir recess 60 overflows the uppermost part of the ridge outer peripheral surface 42 to the main body outer peripheral surface 31 located lower than the target ridge 41 along the circumferential direction, and at the same time overflows the uppermost part of the main body outer peripheral surface 31 to the main body outer peripheral surface 31 located on the side opposite to the target ridge 41 in the circumferential direction with respect to the uppermost part of the main body outer peripheral surface 31. Thus, the refrigerant can be supplied to the main body outer peripheral surface 31 located on both sides of the uppermost part thereof in the circumferential direction by merely supplying the refrigerant to the refrigerant reservoir recess 60, and there is no need to directly supply the refrigerant to the main body outer peripheral surface 31 located on the side opposite to the target ridge 41 in the circumferential direction with respect to the uppermost part of the main body outer peripheral surface 31.

As described above, the sealing walls 51 are formed so as to have a height higher than the horizontal plane extending in the uppermost part of the ridge outer peripheral surface 42. This reduces the possibility that part of the refrigerant axially overflows the sealing walls 51 to the outside of the refrigerant reservoir recess 60 when the refrigerant supplied to the refrigerant reservoir recess 60 overflows the uppermost part of the target ridge 41 to the main body outer peripheral surface 31 located lower than the target ridge 41 along the circumferential direction. Note that it is also preferable that the sealing walls 51 have the same height as the horizontal plane extending in the uppermost part of the ridge outer peripheral surface 42, so that the refrigerant, which has axially overflowed the sealing walls 51 to the outside of the refrigerant reservoir recess 60, is supplied to the coil end portions 23.

Incidentally, in the present embodiment, each bath-shaped portion 71 is provided in the upper part of a corresponding cover member 70 in a form that communicates with the refrigerant reservoir recess 60, as described above. As shown in FIG. 1, each bath-shaped portion 71 has two sidewalls formed along the axial direction, and an end wall formed between the two sidewalls on the side opposite to the stator core 21 in the axial direction. Each bath-shaped portion 71, which is surrounded on three sides by these walls, is structured so that its bottom is positioned lower than the main body outer peripheral surface 31 located between the two sidewalls. The refrigerant reservoir recess 60 and each bath-shaped portion 71 communicate with each other via a corresponding refrigerant inlet 61 (see FIG. 3). In the present embodiment, as shown in detail in FIG. 3, the refrigerant inlet 61 is a substantially triangular space defined by the horizontal plane extending in the uppermost part of the ridge outer peripheral surface 42, the main body outer peripheral surface 31, and the inner surface of the sidewall on the target ridge 41 side of the bath-shaped portion 71. Since each refrigerant inlet 61 is formed in this manner, the refrigerant supplied to the refrigerant reservoir recess 60 is supplied to the bath-shaped portions 71 via the respective refrigerant inlets 61.

The inner communication port 72 is formed in each bath-shaped portion 71. Each inner communication port 72 allows a corresponding bath-shaped portion 71 and the accommodating chamber 73 formed in a corresponding cover member 70 to communicate with each other. In the present embodiment, as shown in FIGS. 1 and 2, each inner communication port 72 is shaped so that a part of the bottom of a corresponding bath-shaped portion 71 is cut out along a corresponding end wall 75. As shown by dotted arrow in FIG. 3, the refrigerant supplied to each bath-shaped portion 71 is supplied downward toward a corresponding accommodating portion 73 through a corresponding inner communication port 72. Note that since the inner communication ports 72 have such a shape as described above, the inner communication ports 72 function as a throttle. Thus, the amount of refrigerant to be supplied to each accommodating chamber 73 can be adjusted by adjusting the size of the opening of the inner communication ports 72. That is, the amount of refrigerant to be used to cool the outer peripheral surface of the stator core 21 and the amount of refrigerant to be used to cool the coil end portions 23 can be controlled.

Each inner communication port 72 is formed near an end of a corresponding bath-shaped portion 71, which is located on the side opposite to the stator core 21 in the axial direction. Thus, when the refrigerant supplied to each bath-shaped portion 71 is supplied to a corresponding accommodating chamber 73 via a corresponding inner communication port 72, the refrigerant is supplied mainly to the axial end of a corresponding coil end portion 23. Thus, in the present embodiment, the refrigerant can be supplied also to the coil end portions 23 by merely supplying the refrigerant to the refrigerant reservoir recess 60. Since each coil end portion 23 is accommodated in a corresponding accommodating chamber 73 defined by the peripheral wall 74 and the end wall 75 of a corresponding cover member 70, the supplied refrigerant flows substantially along the entire circumference of each coil end portion 23.

Although detailed description is omitted, the refrigerant is blown from radially inside to a portion near the axial end of each coil end portion 23 located on the stator core 21 side, by using the centrifugal force associated with rotation of the rotor positioned radially inside the stator 20. This enables substantially the entire axial length of the linear conductors of the coil end portions 23 to be cooled. Note that since the structure of blowing the refrigerant from radially inside to the coil end portions 23 is known in the art, detailed description thereof is omitted. As described above, the radial wall is formed on the inner surface of the cover member 70 attached to one axial side (the upper left side in FIG. 2), so as to protrude radially inward from the peripheral wall 74. This increases the proportion of the refrigerant that contacts the linear conductors of the coil end portion 23 and is subjected to heat exchange therewith, and the frequency of such heat exchange, when the refrigerant passes through the coil end portion 23. Thus, the cooling capability is improved.

Since the stator 20 of the present embodiment has such bath-shaped portions 71, the refrigerant is easily supplied to the coil end portions 23, which respectively protrude from the axial end faces of the stator core 21 located axially outside the stator core 21. Moreover, the axial position to which the refrigerant is supplied in each coil end portion 23 can be easily changed by merely changing the axial position of each inner communication port 72 provided in the bottom of a corresponding bath-shaped portion 71. In the present embodiment, each bath-shaped portion 71 is formed so as to extend across the uppermost part of a corresponding cover member 70. Thus, the refrigerant supplied to each coil end portion 23 via a corresponding inner communication port 72 can be easily supplied to both sides of the uppermost part of each coil end portion 23 in the circumferential direction. That is, providing the bath-shaped portions 71 enables the refrigerant to be supplied to each accommodating chamber 73 accommodating a corresponding coil end portion 23 therein, after being temporarily stored in a corresponding bath-shaped portion 71. Thus, the coil end portions 23 can be cooled appropriately.

In the present embodiment, as shown in FIG. 3, the bottom of each bath-shaped portion 71, where the inner communication port 72 is formed, is positioned lower than the horizontal plane extending in the uppermost part of the ridge outer peripheral surface 42. Thus, when a small amount of refrigerant is supplied to the refrigerant reservoir recess 60, that is, when the amount of refrigerant that is supplied to the refrigerant reservoir recess 60 per unit time is smaller than the amount of refrigerant that flows into the accommodating chamber 73 via the inner communication port 72 per unit time, the refrigerant is supplied mainly only to the coil end portions 23, and is hardly supplied to the main body outer peripheral surface 31 located lower than the target ridge 41 along the circumferential direction, and the main body outer peripheral surface 31 located on the side opposite to the target ridge 41 in the circumferential direction with respect to the uppermost part of the main body outer peripheral surface 31. On the other hand, when a large amount of refrigerant is supplied to the refrigerant reservoir recess 60, that is, when the amount of refrigerant that is supplied to the refrigerant reservoir recess 60 per unit time is larger than the amount of refrigerant that flows into the accommodating chamber 73 via the inner communication port 72 per unit time, the refrigerant is supplied not only to the coil end portions 23, but also to the main body outer peripheral surface 31 located lower than the target ridge 41 along the circumferential direction, and the main body outer peripheral surface 31 located on the side opposite to the target ridge 41 in the circumferential direction with respect to the uppermost part of the main body outer peripheral surface 31. Thus, the following structure can be implemented by structuring the stator 20 so that the amount of refrigerant to be supplied to the refrigerant reservoir recess 60 can be controlled. That is, for example, when a rotating electrical machine is rotating at a low speed, and the proportion of iron loss in total loss is small, the amount of refrigerant to be supplied to the refrigerant reservoir recess 60 is reduced to cool only the coil end portions 23. On the other hand, when the rotating electrical machine is rotating at a high speed, and the proportion of iron loss in total loss is large, the amount of refrigerant to be supplied to the refrigerant reservoir recess 60 is increased to actively cool the outer peripheral surface of the stator core 21 as well.

Figure 4:
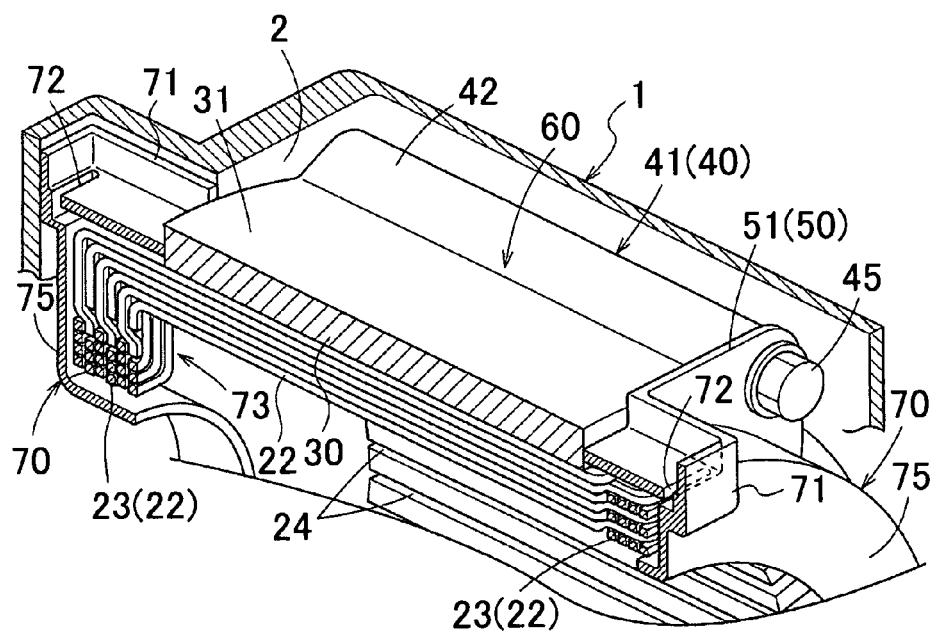
FIG. 4 is an axial cross-sectional perspective view of a stator according to another embodiment of the present invention.

Other Embodiments (1) The above embodiment is described with respect to an example in which the sealing members 50, which respectively form the sealing walls 51, are respectively formed integrally with the cover members 70 that respectively cover, the coil end portions 23. However, embodiments of the present invention are not limited to this. That is, it is also one of preferred embodiments of the present invention to form the sealing members 50 as separate members from the cover members 70. For example, as shown in FIG. 4, it is preferable that only the sealing member, which is attached to one axial end of the stator core 21 (on the upper left side in FIG. 4), be formed as a separate member from the cover member 70. Note that, in this example, the sealing member that is attached to one axial end is formed as a part of a case 1. That is, a seat 2 of the case 1, which is in contact with one axial end of the target ridge 41 in the state where the stator core 21 is fixed, forms a sealing member that forms a sealing wall.

Figure 5:
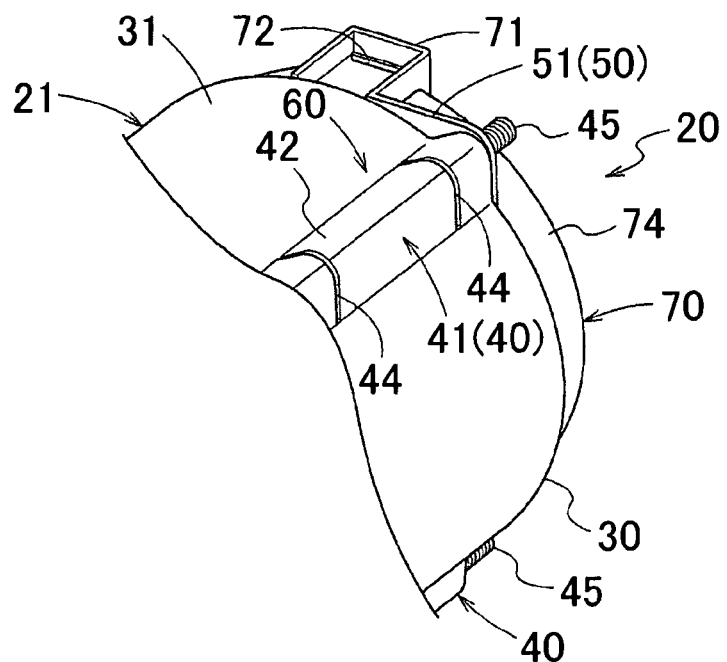
FIG. 5 is a perspective view of a stator according to yet another embodiment of the present invention.
Figure 6:
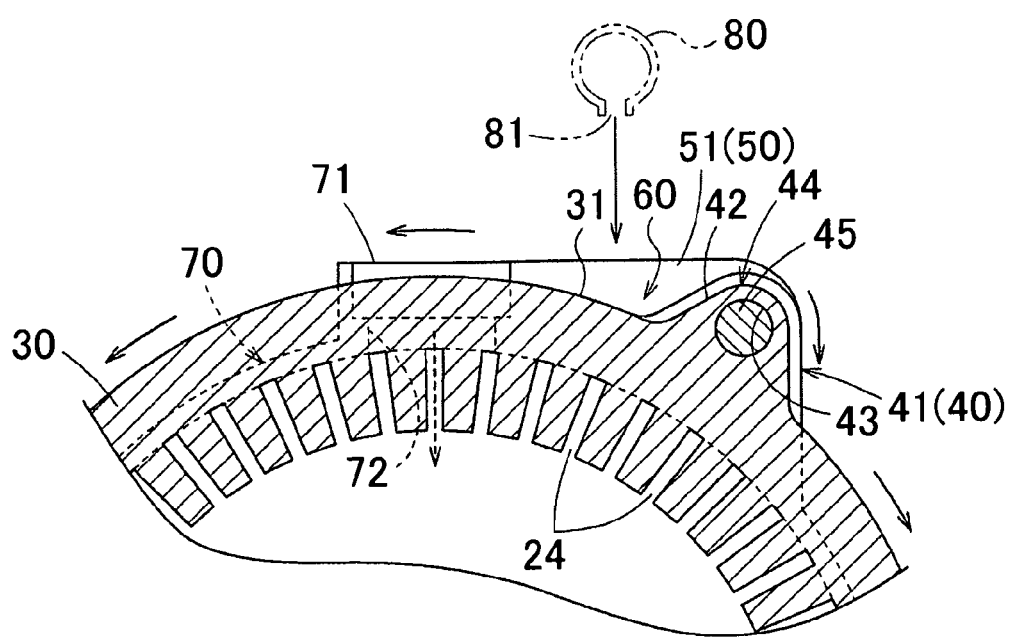
FIG. 6 is a radial cross sectional view of the stator according to the yet another embodiment of the present invention.

(2) The above embodiment is described with respect to an example in which the target ridge 41 is formed uniformly in the axial direction. However, embodiments of the present invention are not limited to this. Thus, for example, as shown in FIGS. 5 and 6, it is also one of preferred embodiments of the present invention that a recess groove 44, which is recessed downward with respect to the uppermost part of the ridge outer peripheral surface 42, be formed at one or more axial positions (two axial positions in the example of FIG. 5) of the target ridge 41. This structure enables the refrigerant, which overflows the refrigerant reservoir recess 60, to be actively guided to each recess groove 44, and thus, enables a predetermined axial position or positions of the stator core 21 to be cooled intensively. Note that it is also preferable that no sealing member 50 be provided in the structure in which such a recess groove or grooves 44 are formed in the target ridge 41.

(3) The above embodiment is described with respect to an example in which the discharge hole 81 for discharging the refrigerant is provided above the refrigerant reservoir recess 60. However, embodiments of the present invention are not limited to this. That is, the position of the discharge hole 81 is not limited to above the refrigerant reservoir recess 60 as long as the refrigerant can be supplied to the refrigerant reservoir recess 60. For example, it is also possible to provide the discharge hole 81 at a position that does not axially overlap the stator core 21, so that the refrigerant is axially blown from the discharge hole 81 toward the stator core 21. It is also preferable to provide the discharge hole 81 above the bath-shaped portions 81 as well, so that the refrigerant is supplied directly to the bath-shaped portions 71. In this case, it is also possible that the bath-shaped portions 71 have no refrigerant inlet 61. The discharge hole 81 may be provided above the main body outer peripheral surface 31 located on the side opposite to the target ridge 41 in the circumferential direction with respect to the uppermost part of the main body outer peripheral surface 31, so that the refrigerant is directly supplied to the main body outer peripheral surface 31.

(4) The above embodiment is described with respect to an example in which the stator core 21 is fixed so that the uppermost part of the ridge outer peripheral surface 42 is located at the same height as the horizontal plane extending in the uppermost part of the main body outer peripheral surface 31. However, embodiments of the present invention are not limited to this. In the case where the stator core 21 is fixed so that the uppermost part of the ridge outer peripheral surface 42 is located lower than the horizontal plane extending in the uppermost part of the main body outer peripheral surface 31, the stator 20 may be structured so that the refrigerant is supplied not only to the refrigerant reservoir recess 60, but also to the main body outer peripheral surface 31 located on the side opposite to the target ridge 41 in the circumferential direction with respect to the uppermost part of the main body outer peripheral surface 31. This enables the outer peripheral surface of the stator core 21, located on both sides of the uppermost part of the main body outer peripheral surface 31 in the circumferential direction, to be cooled.

(5) The above embodiment is described with respect to an example in which the sealing members 50 are attached so that the respective wall surfaces of the sealing walls 51 respectively contact the axial end faces of the stator core 21. However, embodiments of the present invention are not limited to this. Thus, for example, it is also one of preferred embodiments of the present invention to attach the sealing members 50 with a separate member interposed between each axial end face of the stator core 21 and the wall surface of each sealing wall 51.

(6) The above embodiment is described with respect to an example in which each cover member 70 has the bath-shaped portion 71, and the refrigerant reservoir recess 60 and the accommodating chambers 73 respectively formed in the cover members 70 communicate with each other via the bath-shaped portions 71, respectively. However, embodiments of the present invention are not limited to this. Thus, for example, it is also one of preferred embodiments of the present invention that the cover members 70 have no bath-shaped portion 71, and the inner communication ports 72 be formed in the respective peripheral walls 74 of the cover members 70 or the sealing members 50, respectively.

(7) The above embodiment is described with respect to an example in which the stator 20 has the cover members 70, and each cover member 70 has the inner communication port 72 that allows a corresponding accommodating chamber 73 accommodating a corresponding coil end portion therein, and the refrigerant reservoir recess 60 to communicate with each other. However, embodiments of the present invention are not limited to this. Thus, it is also one of preferred embodiments of the present invention that the cover members 70 have no inner communication port 72, and no refrigerant be supplied from the refrigerant reservoir recess 60 to the accommodating chambers 73. It is also preferable that the stator 20 have no cover member 70.

The present invention can be used, in a preferable manner, for stators, which include a substantially cylindrical stator core having fixing ridges, each provided with a fastening portion for fixing, and which are positioned so that the axial center thereof extends substantially horizontally.

What is claimed is:

1. A stator, comprising:
   a substantially cylindrical stator core that has a fixing ridge provided with a fastening portion for fixing, and is positioned so that an axial center of the stator extends substantially horizontally, wherein
   the fixing ridge is formed at a circumferential location of a cylindrical main body portion of the stator core, and protrudes radially outward from a main body outer peripheral surface that is an outer peripheral surface of the main body portion, along an entire axial length of the main body portion, and
   the fixing ridge satisfies the following conditions is a target ridge: an uppermost part of a ridge outer peripheral surface that is an outer peripheral surface of the fixing ridge, is located at the same height as, or lower than a horizontal plane extending in an uppermost part of the main body outer peripheral surface, and the uppermost part of the ridge outer peripheral surface does not correspond to a boundary with the main body outer peripheral surface, the stator further comprising:
   sealing members that are respectively attached to both axial ends of the stator core so as to be positioned on a side of the uppermost part of the main body outer peripheral surface with respect to the target ridge, and respectively form sealing walls that have a height equal to or higher than a horizontal plane extending in the uppermost part of the ridge outer peripheral surface, wherein
   a recess surrounded by the ridge outer peripheral surface, the main body outer peripheral surface, and the sealing walls serves as a refrigerant reservoir recess for storing a refrigerant.

2. The stator according to claim 1, wherein
   the stator core is fixed so that the uppermost part of the ridge outer peripheral surface is located at the same height as the horizontal plane extending in the uppermost part of the main body outer peripheral surface.

3. The stator according to claim 2, wherein
the sealing members are attached so that respective wall surfaces of the sealing walls contact axial end faces of the stator core, respectively.

4. The stator according to claim 3, further comprising:
cover members that respectively cover coil end portions of a coil wound around the stator core that respectively protrude from the axial end faces of the stator core, wherein
each of the cover members includes an inner communication port that allows a accommodating chamber accommodating a corresponding one of the coil end portions therein, and the refrigerant reservoir recess to communicate with each other.

5. The stator according to claim 4, wherein
each of the cover members includes a bath-shaped portion having a refrigerant inlet, where the refrigerant inlet is open upward and communicates with the refrigerant reservoir recess, and
the inner communication port is provided in a bottom of the bath-shaped portion.

6. The stator according to claim 5, wherein
each of the cover members is formed integrally with a corresponding one of the sealing members, and is attachable to the fastening portion provided in the target ridge, and
the sealing members and the cover members are fixed, together with the stator core, to a case by using the fastening portions.

7. The stator according to claim 6, wherein
the case includes a seat that contacts one axial end of the target ridge in a state where the stator core is fixed, and
the sealing member located on one axial side is formed by the seat.

8. The stator according to claim 7, wherein
a recess groove that is recessed downward with respect to the uppermost part of the ridge outer peripheral surface, is formed at one or more axial positions of the target ridge.

9. The stator according to claim 8, further comprising:
a refrigerant flow passage through which the refrigerant flows, wherein
the refrigerant flow passage has a discharge hole for discharging the refrigerant, where the discharge hole is provided at least above the refrigerant reservoir recess.

10. The stator according to claim 1, wherein
the sealing members are attached so that respective wall surfaces of the sealing walls contact axial end faces of the stator core, respectively.

11. The stator according to claim 1, further comprising:
cover members that respectively cover coil end portions of a coil wound around the stator core, and said cover members respectively protrude from the axial end faces of the stator core, wherein
each of the cover members includes an inner communication port that allows a accommodating chamber accommodating a corresponding one of the coil end portions therein, and the refrigerant reservoir recess to communicate with each other.

12. The stator according to claim 1, wherein
a recess groove that is recessed downward with respect to the uppermost part of the ridge outer peripheral surface, is formed at one or more axial positions of the target ridge.

13. The stator according to claim 1, further comprising:
a refrigerant flow passage therethrough which the refrigerant flows, wherein
the refrigerant flow passage has a discharge hole for discharging the refrigerant, where the discharge hole is provided at least above the refrigerant reservoir recess.

14. The stator according to claim 2, further comprising:
cover members that respectively cover coil end portions of a coil wound around the stator core that respectively protrude from the axial end faces of the stator core, wherein
each of the cover members includes an inner communication port that allows a accommodating chamber accommodating a corresponding one of the coil end portions therein, and the refrigerant reservoir recess to communicate with each other.

15. The stator according to claim 2, wherein
a recess groove that is recessed downward with respect to the uppermost part of the ridge outer peripheral surface, is formed at one or more axial positions of the target ridge.

16. The stator according to claim 2, further comprising:
a refrigerant flow passage therethrough which the refrigerant flows, wherein
the refrigerant flow passage has a discharge hole for discharging the refrigerant, where the discharge hole is provided at least above the refrigerant reservoir recess.

17. The stator according to claim 10, further comprising:
cover members that respectively cover coil end portions of a coil wound around the stator core, and said cover members respectively protrude from the axial end faces of the stator core, wherein
each of the cover members includes an inner communication port that allows a accommodating chamber accommodating a corresponding one of the coil end portions therein, and the refrigerant reservoir recess to communicate with each other.

18. The stator according to claim 10, wherein
a recess groove that is recessed downward with respect to the uppermost part of the ridge outer peripheral surface, is formed at one or more axial positions of the target ridge.

19. The stator according to claim 10, further comprising:
a refrigerant flow passage therethrough which the refrigerant flows, wherein
the refrigerant flow passage has a discharge hole for discharging the refrigerant, where the discharge hole is provided at least above the refrigerant reservoir recess.

20. The stator according to claim 11, wherein
each of the cover members includes a bath-shaped portion having a refrigerant inlet, where the refrigerant inlet is open upward and communicates with the refrigerant reservoir recess, and
the inner communication port is provided in a bottom of the bath-shaped portion.

21. The stator according to claim 11, wherein
each of the cover members is formed integrally with a corresponding one of the sealing members, and is attachable to the fastening portion provided in the target ridge, and
the sealing members and the cover members are fixed, together with the stator core, to a case by using the fastening portions.

22. The stator according to claim 11, wherein
a recess groove that is recessed downward with respect to the uppermost part of the ridge outer peripheral surface, is formed at one or more axial positions of the target ridge.

23. The stator according to claim 11, further comprising:

a refrigerant flow passage therethrough which the refrigerant flows, wherein the refrigerant flow passage has a discharge hole for discharging the refrigerant, where the discharge hole is provided at least above the refrigerant reservoir recess.

24. The stator according to claim 3, wherein a recess groove that is recessed downward with respect to the uppermost part of the ridge outer peripheral surface, is formed at one or more axial positions of the target ridge.

25. The stator according to claim 14, wherein each of the cover members is formed integrally with a corresponding one of the sealing members, and is attachable to the fastening portion provided in the target ridge, and the sealing members and the cover members are fixed, together with the stator core, to a case by using the fastening portions.

* * * * *